Patented Apr. 23, 1940

2,198,242

UNITED STATES PATENT OFFICE 2,198,242

TUBE TESTER

George M. Buchard, Dayton, Ohio

Application June 22, 1939, Serial No. 280,551

9 Claims. (Cl. 250—27)

This invention relates to a tube tester and more particularly to a tube tester for testing the functioning of the several electrodes found in thermionic vacuum tubes and the like.

An object of this invention is to provide a tube tester for testing the functioning of a plurality of electrodes in any one thermionic vacuum tube selected from a great variety of types of thermionic vacuum tubes now appearing on the market, by a tube tester that is dependable, efficient, economically produced and easily operated by an unskilled operator.

Another object of this invention is to provide a tube tester that automatically tests the several electrodes for short-circuit immediately upon the electrodes being connected into the testing circuit.

Another object of this invention is to provide a current limiting device for supplying the current flowing through the electrode under test to the current measuring device.

Another object of this invention is to provide a reversing switch for reversing the sequence of a plurality of switches used in connecting the electrodes of a thermionic vacuum tube into the tube testing circuit.

Another object of this invention is to provide a release device for releasing one or a plurality of switches closing certain predetermined circuits upon the completion of the test.

Another object of this invention is to provide a switching device having a plurality of switches, some of which are locked in position when closed, which switches are associated with a common release for opening all of the switches at the option of the operator.

Other objects and advantages reside in the construction of parts, the combination thereof and the mode of operation, as will become more apparent from the following description.

Before describing the tube tester disclosed herein in detail, a brief history of the tube tester development will be made. The advent of thermionic vacuum tubes and the extensive use of these vacuum tubes in radio broadcasting equipment, radio receiving equipment and other devices utilizing such tubes, has presented numerous problems akin to the production of such tubes, the testing thereof before being sold and the testing thereof after seeing service.

The first tubes that gave rise to the radio industry utilizing thermionic vacuum tubes were the diode or two element tubes and the triode or three element tubes. These were followed by other types of tubes such as the screen grid tube, pentode and more recently by more complicated tube structures. For an accurate test of the performance of the thermionic vacuum tube, it is preferable to test the function of each electrode, or rather pair of electrodes, so as to determine the condition and the qualities of the tube. Such tests should be made under conditions simulating normal operating conditions of the tube. These tests may be conducted in a laboratory by constructing circuits simulating the normal circuit in which the tube is used; but such laboratory tests are not satisfactory for testing tubes coming off of the line in mass production and for testing tubes used in the field. Due to the fact that thermionic vacuum tubes are used in practically every section of the country, tube testers are required in all parts of the land.

Unfortunately, the great majority of service men are not warranted in a large expenditure for tube testers utilizing extremely complicated circuits provided with a plurality of switches, resistances, loads, controls and the like. Several years ago, as a result of this condition, the radio manufacturers' association recommended a simple tube tester measuring the emission output of the cathode. This was accomplished by supplying a filament current so as to energize the filament and usually a voltage of approximately thirty volts connected in series with a suitable load to the control grid, anode and other electrodes normally used in the tube circuit. This reading would indicate the amount of current passing from the cathode to the several electrodes; but the current flow thus indicated is oftentimes very misleading, in that if one of the electrodes were open-circuited or short-circuited, this might not materially influence the current flow. As a specific illustration, let it be assumed that a screen grid tube is to be tested. A filament current is supplied to the filament, so as to energize the cathode whether directly or indirectly heated. The control grid, the screen grid and the anode or plate terminals are all connected together and energized from a voltage of approximately thirty volts supplied through a suitable load.

This test may prove very misleading. If, for example, the screen grid tube is to be tested, the screen grid, the plate and the control grid would all be energized from the same source of energy, that is, the same voltage would be supplied to all three electrodes. As is well known to those skilled in the art, the control grid is usually located nearest the cathode. Furthermore, under normal operating conditions, the voltage supplied to the control grid is usually much lower than the voltage supplied to the screen grid and the plate.

From this it may be seen that these tests are made under abnormal operating conditions. By supplying this high voltage to the control grid it would make very little difference in the amount of current emitted from the cathode either with or without the screen grid or the plate being connected into the circuit. Thus, by these tests, the tube would appear to function even though the screen grid or the plate were open-circuited or short-circuited to one of the other electrodes other than the cathode. This test was based on the theory that the tube manufacturer would construct and arrange the electrodes in such a manner that there would be no danger of short-circuits and no danger of open-circuits within the tube, as long as the cathode functions. It has been recognized that this test was not as good as desirable; but due to the necessity of producing a cheap tube tester, produced at a price within the range of the majority of service men, it has served the purpose in a haphazard manner.

In the past attempts have been made to provide a tube tester wherein the electrode circuit of each electrode may be tested. This has been accomplished by the use of a great multiplicity of circuit switches, which are used to supply the proper voltages and to connect the meter into the several circuits. This, however, is objectionable, for the reason that the cost of production is extremely high and the skill required to operate the tester is beyond the skill of many users of tube testers.

In applicant's copending application Serial No. 213,947 the great number of switches required to perform the test is reduced by the use of a preselector switch, a circuit switch and a special test switch, together with the conventional line voltage controls, load controls, et cetera.

In the present embodiment the circuit arrangement has been greatly simplified by the use of a bank of switches, which, when operated in certain predetermined sequences, selects the proper circuit arrangements, without unduly multiplying the number of switches required to conduct the test. In addition thereto, this circuit arrangement automatically tests the several electrodes for short-circuit as the proper switches are closed to connect the proper electrodes into the proper circuits. If an electrode is short-circuited, a glow tube will be illuminated as soon as this electrode is connected into the circuit. From then on the glow tube remains energized until the proper load is supplied to the tube, when the glow tube is automatically switched out of the circuit.

Due to the possibility of overloading the meter for measuring the current flow, a current limiting device is used to limit the current within the range of the meter.

Figure 1:
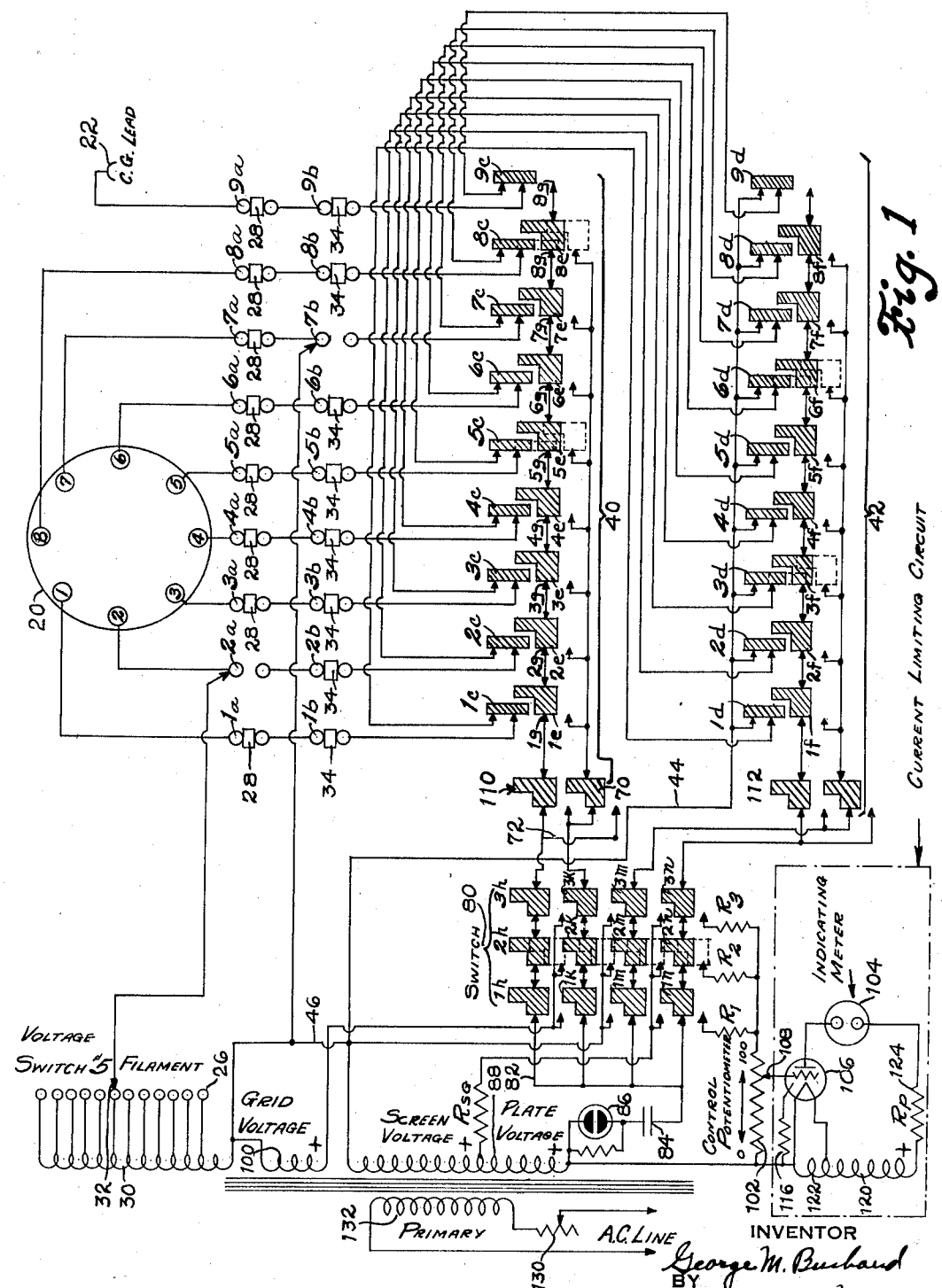
Figure 1 is a schematic wiring diagram simplified for the convenience of explanation.

Broadly, the device disclosed herein, in addition to filament switches and line voltage controls, includes one gang of switches controlling the cathode and control grid circuits in a predetermined order or sequence, which sequence is reversible, a second gang of switches for controlling the anode circuits, such as the plate and screen grid circuits, in a predetermined sequence, which sequence is reversible, which gang of switches may be actuated in seriatim for testing the electrodes for short-circuits and in addition thereto, a gang of load switches for disconnecting the short circuiting test circuits, for supplying proper loads or voltages to the electrodes under test and for connecting an indicating device into the circuit for measuring the characteristics of the tube.

Instead of showing a multiplicity of sockets, only one tube socket has been shown, designated by the reference character 20. A number of tube sockets may be used and interconnected into the circuit network much the same as the socket arrangement in my copending application Serial No. 213,947, filed June 15, 1938. The tube socket shown herein has eight terminals, adapted to receive eight prongs. The prong terminals have been designated by reference numerals 1 to 8 for convenience. In addition thereto, a control grid cap 22 may be used to connect the control grid into the circuit. The prongs 1 to 8 and the control grid cap 22 are connected to the switch terminals 1a, 2a, 3a, 4a, 5a, 6a, 7a, 8a and 9a respectively. Two of these terminals or prongs of the tube may be referred to as filament terminals. In the schematic wiring diagram that has been shown, prongs 2 and 7 constitute the filament terminals. Through a suitable switch arrangement, terminal 2a is connected to a preselected tap 26 of the transformer winding 30. Through a suitable switch arrangement that is well known to those skilled in the art, the contact terminals 1a, 3a, 4a, 5a, 6a, 7a, 8a and 9a are connected to switch terminals 1b, 3b, 4b, 5b, 6b, 7b, 8b and 9b respectively through contact elements 28. The switch terminal 7b is connected to a terminal of the transformer winding 30. The proper voltage or current is supplied to the filament by merely adjusting the contact 32, so as to engage the proper tap 26. The circuit through the filament prongs 2 and 7 have been completed to the source of energy. The switch terminals 1b, 2b, 3b, 4b, 5b, 6b, 8b and 9b are closed and connected to their respective circuits by means of contacts 34.

The leads from the several prongs and the control grid cap, with the exception of the leads from the prongs 2 and 7, are now all closed through terminals 1c, 3c, 4c, 5c, 6c, 8c and 9c of a gang of switches 40. The contacts 1c, 3c, 4c, 5c, 6c, 8c and 9c of the gang of switches 40 are all movable, as will appear more fully later. The movable contacts 1c, 3c, 4c, 5c, 6c, 8c and 9c are in the position shown in Figure 1 in contact with terminals connected by suitable leads to movable contacts 1d, 2d, 3d, 4d, 5d, 6d, 7d, 8d and 9d of the gang of switches 42. When the gang of switches 42 are in the position shown in Figure 1, all of the contacts 1d, 2d, 3d, 4d, 5d, 6d, 7d, 8d and 9d are returned through the lead 44 connected by a lead 46 to the ground terminal of the filaments represented by the terminals 7d. When the switches are in this position, as disclosed in Figure 1, zero potential is supplied to all of the prongs of the tube with the exception of the filament prongs 2 and 7.

For the purpose of illustration of the operation of the tube tester and an explanation of the several load circuits and test circuits in the tube tester, the switches will be actuated which will be required to test a type 6C5 triode, which has the following arrangement of the prongs in the base thereof. Prong #1 is connected to the shell; prong #2 to the heater or element; prong #3 to the plate or anode; prong #4 open; prong #5 grid; prong #6 open; prong #7 heater element or filament; prong #8 cathode.

The several load circuits may be selected by proper manipulation of the switch arrangement shown including the gang switches 40 and 42. As already described, the filament or heater prongs 2 and 7 have been connected into suitable taps on the transformer winding 30. All of the other prongs have been connected to the movable switch elements 1c, 3c, 4c, 5c, 6c, 8c and 9c and 1d, 3d, 4d, 5d, 6d, 8d and 9d respectively. After the tube has been inserted into the socket and sufficient time has elapsed for the filament or heater to become heated, push button 5c is actuated into "down" position.

Figure 2:
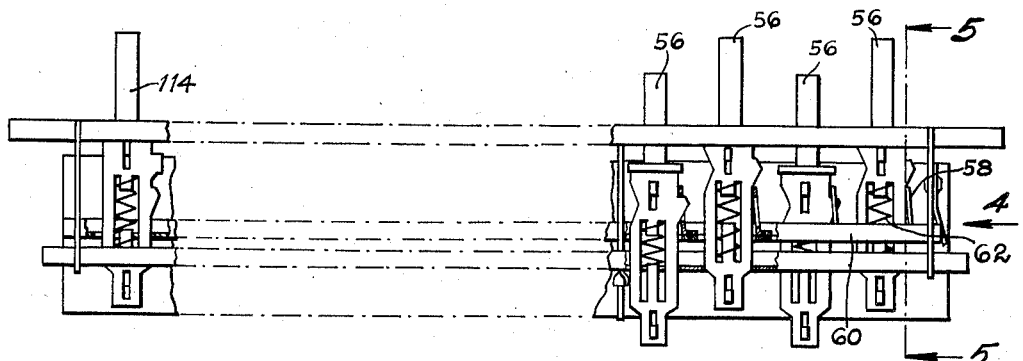
Figure 2 is a fragmentary side view of several switch elements of one of the gang switches and the locking means therefor, together with releasing mechanism.
Figure 3:
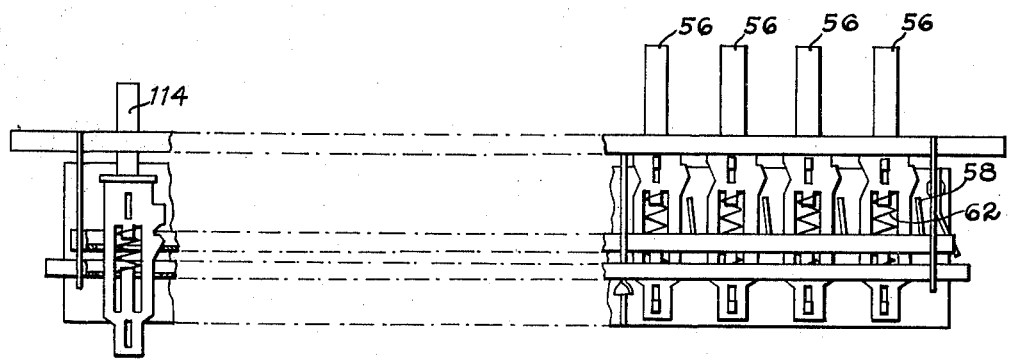
Figure 3 is another fragmentary view similar to Figure 2, showing the release mechanism of the switch in releasing position.
Figure 4:
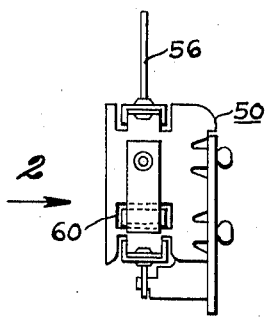
Figure 4 is an end elevational view of the switches looking in the direction of the arrow 4 in Figure 2.
Figure 5:
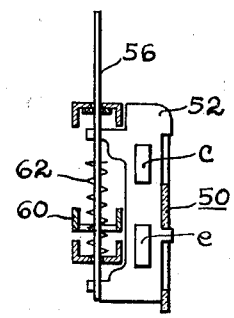
Figure 5 is a cross sectional view taken substantially on the line 5—5 of Figure 2.

By referring to Figure 2, it can be readily seen that the push button 50 of each gang of switches, only one of which has been shown, supports an insulating member 52 carrying the contacts c and e of the gang of switches 40. The contacts d and f in the gang of switches 42 are likewise mounted, in that the mechanical structure of switches 40 and 42 is identical. When the button is depressed, the actuating lever 56 which is provided with a cap is locked in "down" position by a latch 58 carried upon a transverse member 60. Member 56 is always biased in an "up" position by a spring 62. When the push button is forced into "down" position and locked in this position, as may best be seen by referring to Figure 1, the movable contacts 5c and 5e are actuated into "down" position so as to disconnect the movable contact 5c from the lead extending to the movable contact 5d of the gang of switches 42. Instead of being connected to the lead extending to the movable contact 5d of the gang of switches 42, the movable contact 5c is now connected to a fixed contact 5g, connected in series through the contacts 1e to 4e, contact 70, lead 72, contacts 3h, 2h and 1h of a gang of switches 80 connected through a lead 82, through a suitable blocking condenser 84, a glow tube 86 having the opposite terminal connected to the secondary of a transformer winding 86 energized from a suitable source of energy. The opposite terminal of the transformer winding 88 is returned through 46.

If the electrode of the tube, which in the particular illustration happens to be the control grid, is short-circuited, the glow tube 86 will be energized, so as to show a glow. The blocking condenser 84 prevents any rectified current from energizing the glow tube. If the glow tube 86 does not glow, it is an indication that the control grid is not short-circuited. After this operation is completed, the push button corresponding to the movable contact 8c is depressed or forced down into the "down" position. The contact 8c is then disconnected from the lead that formerly connected the contact 8c to the contact 9d; but instead the movable contact 8c makes a contact with 8g, which is connected through the previous contacts 7e, 6e and 5e to a lead 90 that is connected through a series of contacts 3k, 2k and 1k in the switch 80 through the condenser 84, the glow tube 86 and the winding 88. If this element, which happens to be the cathode of the tube under test, is short-circuited to any of the other electrodes, the glow tube 86 will be energized. If it is not short-circuited, the glow tube will remain dormant, as the blocking condenser 84 will block out any rectified current that may flow through the cathode. The push buttons of gang switch 40 are utilized to select the circuit arrangement for the cathode and the control grid of ordinary thermionic vacuum tube testers, as will appear more clearly later.

Finally, the push button that actuates the movable contact 3d is depressed, so as to disconnect this contact directly from ground, but instead, connect the movable contact into the "down" position, closing the circuit through the glow tube 86, so as to test this electrode for short circuit. If any of the elements of the tube are short-circuited, the glow tube would now glow. If the glow tube does not glow, it is an indication that there are no short-circuits in the tube; but it does not follow from this that the tube will necessarily function, or function properly. After all, the proper flow of current usually through the anode as influenced by the control grid and the screen grid if any, or any other electrodes that may be in the tube, is the important characteristic of the tube as far as its utility in its circuit is concerned.

As is well known to those skilled in the art, the flow of current through a tube is dependent upon the relative potentials and the load in the circuit connected to the tube. The load and proper voltages are selected for the several electrodes in the tube through the gang of load switches 80. This preferably has three or more push buttons, each push button actuating four movable contacts, which, for convenience, have been labelled h, k, m and n, together with appropriate digits, as seen in the drawings, that is 1h, 2h, 3h et cetera. If, for example, the middle push button is actuated, the movable contacts 2h, 2k, 2m and 2n will be moved downwardly into dot-dash position, which disconnects the several electrodes from the glow tube circuit and instead, supplies the proper potential to each of these contacts, and thereby to the corresponding electrodes of the tube. The movable contact 2h will be moved down, so as to connect the fifth prong, that is, the grid of the tube, to the grid voltage supplied from a suitable transformer winding 100, which may be provided with taps if desired. The movable contact 2k is moved downwardly, so as to connect the electrode connected to the prong 8, that is, the cathode of the tube, through the lead 46 to a common terminal hereinafter referred to as the return. The prong 3 of the tube is connected by the movable contact 2n through a resistance $R_2$ through a suitable potentiometer 102 to the transformer winding 88, so as to supply a voltage to the plate. The resistances $R_1$, $R_2$ and $R_3$ differ from each other, so as to cause different loads to be available for the plate of the tube under test, the proper voltage and plate load being selected through the load switch 80. In view of the fact that this particular tube does not have a screen grid, the movable contact 2m is open-circuited and has no particular function in testing a triode.

If a screen grid tube were to be tested, and let it be assumed for the sake of illustration that the screen grid terminal were connected to the prong 6, in this event the push button corresponding to the movable contacts 6d and 6f would be depressed, so as to connect the movable contact element 6d to the contact formerly in engagement with the movable element 6f. Before pressing the load key in the switch 80 the screen grid would first be connected to the glow tube 86, so as to test it for short-circuit. As before, if the screen grid were short-circuited, the glow tube would be illuminated. If the glow tube is not illuminated, it is an indication that the screen grid is not short-circuited. It can be readily seen by tracing the circuit that the movable contact 6d would then be energized through the movable contact 3f, which is in the "down" position and through the movable contact m of the load switch through the resistance $R_{sg}$, which has one terminal connected to a suitable tap upon the transformer winding 88. Thus, it is seen that the screen grid would be energized immediately upon depression of the proper load key in the switch 80.

From the foregoing, it may readily be seen that the movable contacts c and e are used to connect the control grid and the cathode into the proper circuits. Likewise, it may readily be seen that the contacts d and f in the gang of switches 42 have been used to connect the anode and the screen grid of the tube into the proper load circuits. Furthermore, the circuit arrangement is such that the grid voltage is supplied to the prong connected to the first movable contact from the left in the gang of switches 40, as shown in Figure 1, and the cathode is returned by the second movable contact actuated in the "down" position in the gang of switches 40. In the particular illustration described above, the control grid represents the fifth terminal and the cathode the eighth. In a similar manner, the circuit arrangement shown in Figure 1 is such that the anode circuit is closed by the first movable contact from the left of Figure 1 in the gang of switches 42 that is actuated into the "down" position and the screen grid is closed by the second movable contact that is actuated into the "down" position.

It does not follow that the order of the prong of the control grid with respect to the cathode prong and the anode prong with respect to the screen grid prong is always in the order set forth in the illustration above. There are tubes on the market where the order of one or both pairs of prongs is reversed, that is, a tube may be designed wherein the prong 5 represents a cathode and the prong 6 represents the control grid. If such a tube is to be tested, it is necessary to reverse the voltages applied to the movable contact c. This has been accomplished by a reversing switch 110 which is built into the unit of the gang of switches 40. Likewise, the anode and the screen grid circuits may be reversed by a reversing switch 112 in the gang of switches 42. By actuating one or both of these reversing switches, the circuits may be reversed so as to accommodate any order of prong distribution. Although switches 110 and 112 have been referred to as reversing switches, these switches can also be designated as circuit selecting switches for selecting the appropriate circuits for each of the electrodes of the tube under test.

The switches 40 and 42 have been referred to as gang switches for the reason that in the particular embodiment of the tube tester disclosed herein two gangs of switches have been used, the first, in the initial position connecting the several prong terminals to contacts of the second gang of switches. Instead of two gangs of switches, all of these switches could be incorporated into one unit, or could be used individually, providing one series of switches in the initial position connects the proper terminals to the suitable switch contacts in the second series of switches. One series of switches is used to connect certain prong terminals into loads or voltage circuits supplying the proper loads and proper voltages to predetermined electrodes and the remaining switches of the first series connecting the remaining prongs to the second series of switches used to supply proper loads and proper voltages to the remaining prongs and electrodes of the tube under test.

The reversing switches and the switches c, e, d and f are all locked in "down" position when the respective push buttons are actuated; but in no case are the load switches in the gang of switches 80 locked in "down" position, as the load is applied only momentarily and for a period sufficient to take the reading on the indicating meter 104.

It has been common practice in the past to connect the plate circuit of the tube under test into a milliammeter so as to read the amount of plate current flowing through the plate circuit of the tube under test. In the first place, the magnitude of the plate current varies greatly with different types of tubes. That being the case, it is the usual practice to select such voltages for the tube that the current flow through the larger tubes is quite low—only a small per cent of the tubes' normal current flow. This, however, may lead to complications in the case of an error. In the event improper voltages are selected for the tube, especially if a higher plate voltage is used, together with improper grid bias, the plate current may exceed the capacity of the milliammeter, thereby injuring and possibly completely burning out the milliammeter. The chances of such a mistake are increased when the tube testers are manipulated by unskilled operators, as is oftentimes the case where tube testers are sold in large quantities to all types and classes of people.

In the present embodiment this possibility of overloading the milliammeter has been completely eliminated by a current limiting device. This current limiting device has been so designed that within the operative range as the current through the plate or the electrode of the tube under test increases, the current through the milliammeter decreases. In other words, the current flowing through the current limiting device varies inversely as the current through the electrode circuit that is to be measured. That being the case, in the event an error is made in closing the switches so as to supply improper voltages to the tube under test, the current through the milliammeter indicating the current flow decreases and may approach zero in magnitude. This completely eliminates any chances of injury to the milliammeter from excessive load currents. In addition thereto, this current limiting device before being connected into the load circuit of the tube under test, functions as a milliammeter for measuring the line voltage, so as to adjust the line voltage, as will appear more fully from the detailed description of the circuit arrangement used.

The current limiting device is associated with a potentiometer 102 that is connected in series with the resistances $R_1$, $R_2$ and $R_3$ used in supplying a load to the plate circuit or the anode circuit of the tube. The current limiting device includes the tube 106 provided with a control grid connected with a tap 108 of the potentiometer 102. The cathode of the tube 106 is connected through a resistance 116 to one terminal of the potentiometer 102. The resistance 116 is also connected to one terminal of a transformer winding 120 having a portion 122 connected across the filament or the heater element of the tube 106. The other terminal of the transformer winding 120 is connected through a load resistance 124 and the milliammeter 104 to the plate of the tube 106.

Before the current limiting device, including the milliammeter 104, is connected into the circuit of the tube under test, that is, before one of the load switches 80 is actuated, there will be no voltage drop across the resistance 102. At that time the negative grid bias supplied to the control grid of the tube 106 will be equal to a small voltage drop across the resistance 116 in the cathode circuit. At this time a current will flow through the tube 106 by virtue of the voltage supplied to the plate of the tube 106 by the transformer winding 120 and the loads 116 and 124 in the external circuit connecting the cathode to the plate. At this time the milliammeter 104 may be used to indicate the line voltage. If the line voltage is too high or too low, this line voltage may be reduced or increased as the case may be by means of a variable resistance 130 connected in series with the primary winding 132 of the input transformer. By varying the resistance 130 the voltage may be regulated to a predetermined value, as measured by the milliammeter 104. After the line voltage has been regulated and after the short-circuit tests have been completed, as described above, and certain switches held in "down" position, one of the load switches in the gang of switches 80 may be depressed, so as to connect the proper load into the tube circuit under test. As previously described, one of the resistances $R_1$, $R_2$ or $R_3$ is connected in series with the plate of the tube under test. This causes the plate current of the tube under test to flow through the resistance 102, causing a voltage drop across this resistance, thereby reducing the voltage supplied to the grid 108, reducing the current flowing through the milliammeter 104. The voltage drop across the resistance 102 is proportional to the current flowing through the plate circuit of the tube under test. That being the case, the grid of the tube 106 becomes more negatively biased, as the plate circuit current of the tube under test increases, thereby reducing the current flowing through the milliammeter 104. From this it is very evident that before the load circuit is supplied to the tube under test, the maximum current flows through the milliammeter 104, for the reason that at this time the grid of the tube 106 is more positively biased than under any other circumstances. In other words, before the load is supplied to the tube to be tested, the maximum current flows through the milliammeter.

The circuit arrangement and the values of the loads may be so selected that when the proper voltage is supplied to the input transformer, the milliammeter needle or pointer registers with the predetermined indicant, preferably at one extreme of the milliammeter scale. If the deflection from maximum when the load is supplied to the tube under test is slight, it indicates that the amount of current flowing through the plate circuit of the tube under test is slight and that the tube is defective. On the other hand, if the deflection is substantial and equals a predetermined amount, or exceeds this amount, it indicates that the tube under test operates satisfactorily, in spite of the fact that the current flowing through the milliammeter is decreasing. This is based on the assumption that the variable grid contact 108 is properly adjusted. This may be adjusted to take care of various types of tubes and changed conditions.

Obviously, in order that the readings obtained represent the true condition of the tube, the phase relation of the voltages as determined by the windings of the secondary of the transformer must be such that the readings are taken during the positive cycle of the voltages supplied to the plate of the tube under test.

In the current limiting device shown, a triode tube has been used. This current limiting tube or auxiliary tube 106 may be any other suitable tube, such as a screen grid tube. Furthermore, the particular circuit arrangement shown happens to disclose eight prongs in the tube socket. Instead of eight prongs, any other number of prongs may be used incorporating the same principle. Likewise, the gang switch 80 discloses three loads. These have been shown merely for the purpose of illustration. Any number of loads may be used. Instead of one voltage being available for the circuit of the tube under test, the resistances $R_1$, $R_2$ and $R_3$ could be connected to suitable taps in the secondary of the transformer winding, so as to have available various voltages to be supplied to the loads available for the plate circuit of the tube under test.

In some cases it may be desirable to determine the current flow through the screen grid circuit or some other electrode of the tube. If so, the principles disclosed above could be incorporated so as to read or measure the current flow through any other electrode of the tube. The circuit arrangement disclosed herein has been used merely for the purpose of illustration, so as to illustrate the principles involved rather than as limitations.

After the test is completed, it is necessary to unlock the switches that have been actuated into "down" position in the gang of switches 40 and 42. As may best be seen by referring to Figure 2, this is accomplished by actuating the push button or the release button 114. When this is done, the entire circuit arrangement as far as the gang of swiches 40 and 42 is concerned, is actuated into initial "home" position, in readiness for a succeeding test. These release buttons release all of the switches $c$, $e$, $d$, $f$ and the reversing switches 110 and 112.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a tube tester adapted to test the functioning of the electrodes of a tube for short-circuits and current carrying capacity, the combination including a tube socket having a plurality of prong terminals, a circuit network for interconnecting the tube socket into the test circuit, said circuit network including two gangs of switches, a glow tube having a terminal connected into the circuit network and a source of energy connected to the other terminal of the glow tube, one gang of switches being utilized to interconnect the respective prong terminals to the glow tube, the other gang of switches being utilized to interconnect the remaining prongs of the tube socket to the glow tube so that as predetermined switches are closed in seriatim each electrode is tested for short-circuit, and means for supplying proper voltages and loads to the prong terminals of the tube socket, said means automatically disconnecting the glow tube from the prongs of the tube socket, said means including a current indicating device for indicating the current flowing through one electrode.

2. In a tube tester for testing a thermionic vacuum tube for short-circuits and load currents, said tube having a plurality of prongs some of which are filament prongs, the combination including a tube socket having a plurality of prongs for receiving the prongs of the tube under test, a circuit network including means for energizing the filament prongs, a pair of gang switching means each of which is provided with a switch for each prong terminal, a short-circuit indicating device connected to said gang switching means when predetermined switches in one of the gang switching means are closed so as to connect some of the prong terminals to the short-circuit indicating device, the remaining prong terminals being connected into the short-circiut indicating device by closing the corresponding switching means in the second gang of switches, and a load interconnecting switching means for supplying loads and voltages to the prong terminals of the tube socket, said load switching means automatically disconnecting the short-circuit indicating device from the circuit and substituting therefor a current indicating device for indicating the current flowing through one of the prong terminals of the tube socket having the tube under test inserted therein.

3. In a tube tester adapted to test the functioning of the electrodes of a tube for short-circuit and for load currents, the combination including a tube socket having a plurality of prong terminals, a circuit network for interconnecting the tube socket into the test circuit, said circuit network including two series of switching means connected in series to the prong terminals of the tube socket when in initial position, each series of switching means including a switch for each prong terminal, short circuit testing means interconnected to predetermined prong terminals by manipulation of some of the switches in the first series of switching means, said manipulation disconnecting the corresponding prong terminals from the second series of switching means, said second switching means interconnecting the short circuit indicating device into the circuits of the remaining prongs of the tube socket by manipulation of the corresponding switches in the second series of switching means, voltage selecting means interconnecting the circuit networks in series with the prong terminals of the tube socket, and means for supplying predetermined voltages to the prong terminals of the tube socket, said means supplying loads and voltages simulating normal operating conditions of the tube socket having the tube under test mounted therein.

4. In a tube tester adapted to test the functioning of the electrodes of a tube for short-circuit and for load currents, the combination including a tube socket having a plurality of prong terminals, one for each of the prong terminals in the bottom of the tube, a circuit network for interconnecting the tube socket into the test circuit, said circuit network including two series of switching means each having a switch connected in series to the prong terminals of the tube socket when in initial position, short circuit testing means interconnected to predetermined prong terminals by manipulation of some of the switches in the one series of switching means, said manipulation disconnecting the corresponding prong terminals from the other series of switching means, said other switching means interconnecting the short circuit indicating device into the circuits of the remaining prongs of the tube socket by manipulation of the corresponding switches in said other series of switching means, voltage selecting means interconnecting the circuit networks in series with the prong terminals of the tube socket, means for supplying predetermined voltages to the prong terminals of the tube socket, said means supplying loads and voltages simulating normal operating conditions of the tube socket having the tube under test mounted therein, and means for indicating the current flowing through a predetermined prong terminal for indicating the functioning of the tube under test.

5. In a tube tester adapted to test the functioning of the electrodes of a tube for short-circuit and for load currents, the combination including a tube socket having a plurality of prong terminals interconnected to the electrodes of the tube under test, a circuit network for interconnecting the tube socket into the test circuit, said circuit network including two series of switching means connected in series to the prong terminals of the tube socket when in initial position, short circuit testing means interconnected to predetermined prong terminals by manipulation of some of the switches in the first series of switching means, said manipulation disconnecting the corresponding prong terminals from the second series of switching means, said second switching means interconnecting the short circuit indicating device into the circuits of the remaining prongs of the tube socket by manipulation of the corresponding switches in the second series of switching means, voltage selecting means interconnecting the circuit networks in series with the prong terminals of the tube socket, means for supplying predetermined voltages to the prong terminals of the tube socket, said means supplying loads and voltages simulating normal operating conditions to the prong terminals having the tube under test mounted therein, and current limiting means for indicating the current flowing through one of the prong terminals of the tube socket, said current limiting means including a milliammeter and means for causing a current to flow through the milliammeter varying inversely as the load current flowing through said prong terminal.

6. A current indicating device for a tube tester having a circuit network for connecting loads and voltage sources to the electrodes through prongs of the tube socket supporting the tube under test, said circuit network including a variably tapped potentiometer connected in series with one prong of the tube socket supporting the tube to be measured, said current indicating device including a vacuum tube, means for supplying a suitable voltage and load to the plate thereof, means for interconnecting the control grid of the tube to the tap on the potentiometer so as to bias the grid more negatively as the current through the potentiometer increases, and a milliammeter in the plate circuit for measuring the load current from the prong terminal of the tube socket having the tube under test mounted therein, said milliammeter showing a decrease in current flow when the current flow through the potentiometer increases.

7. A circuit network for a tube tester for testing a tube under test, said circuit network including means for connecting loads and voltage sources to the electrodes of the tube under test, said means including two series of switching devices connected in series, each series of switching devices including a plurality of switches one for each electrode of the tube under test, short circuit testing means including a short circuit indicating device interconnected to predetermined electrodes by manipulation of some of the switches in one series of the switching devices, said manipulation disconnecting the corresponding electrodes from the switches in the other switching devices, said other switching devices interconnecting the short circuit indicating device to the remaining electrodes of the tube by manipulation of the corresponding switches in said other switching devices, voltage selecting means interconnecting the circuit network in series with the electrodes of the tube under test, means for supplying predetermined voltages to the electrodes of the tube, said means supplying loads and voltages simulating normal operating conditions of the tube under test and means for indicating the current flowing through a predetermined electrode circuit for indicating the functioning of the tube under test.

8. A circuit network for use in a tube tester for indicating operative characteristics of the tube under test, said circuit network including means for interconnecting said circuit network to the electrodes of the tube under test, said network including a plurality of parallel circuits one for each of the electrodes of the tube under test, each of the parallel circuits including a pair of switching devices normally connected in tandem, a short circuit indicating device, one switch in some of the parallel circuits upon being operated connecting its electrode into the short circuit indicating device, means for supplying loads and voltages to the tube under test, a plurality of multiple contact switching means for disconnecting the short circuit indicating device and for interconnecting said means for supplying loads and voltages simulating normal operating conditions of the tube under test, and means for indicating the current flowing through a predetermined electrode circuit for indicating the functioning of the tube under test.

9. A circuit network for use in a tube tester adapted to test the functioning of electrodes of a tube for short circuits and for load currents, said circuit network including means for interconnecting the electrodes of the tube under test into the circuit network, two series of switching means connected in series with the electrodes when in initial position, each series of switching means including a switch for each electrode of the tube, short circuit testing means interconnected to predetermined electrodes by manipulation of some of the switches in the first series of switching means, said manipulation disconnecting the corresponding electrodes from the second series of switching means, manipulation of the switches in the second series of switches corresponding to the remaining electrodes interconnecting said remaining electrodes into the short circuit indicating device, voltage selecting means for interconnecting the circuit network in series with the electrodes of the tube under test, and means for supplying predetermined voltages to the electrodes of the tube under test, said means supplying loads and voltages simulating normal operating conditions of the tube under test.

GEORGE M. BUCHARD.